United States Patent [19]

Frei

[11] 4,375,588
[45] Mar. 1, 1983

[54] PROCESS AND APPARATUS FOR CONTROLLING THE CONCENTRATION OF SOLID PARTICLES IN SUSPENSION IN AN EDM MACHINING FLUID

[75] Inventor: Charles Frei, Onex, Switzerland

[73] Assignee: Ateliers des Charmilles, S.A., Geneva, Switzerland

[21] Appl. No.: 208,935

[22] Filed: Nov. 21, 1980

[30] Foreign Application Priority Data

Dec. 6, 1979 [CH] Switzerland ............... 10819/79

[51] Int. Cl.³ .................................................. B23P 1/02
[52] U.S. Cl. ................................ 219/69 M; 219/69 D; 219/69 C; 219/69 G; 219/69 P
[58] Field of Search ............... 219/69 D, 69 C, 69 G, 219/69 M, 69 P

[56] References Cited

U.S. PATENT DOCUMENTS 3,609,281  9/1971  Kauffman ..................... 219/69 C
3,699,303  10/1972 Kauffman et al. ............. 219/69 D
3,739,137  6/1973  Marendaz ...................... 219/69 C
3,825,714  7/1974  Marendaz ...................... 219/69 M
4,049,942  9/1977  Balleys et al. ................ 219/69 G

FOREIGN PATENT DOCUMENTS 536680  6/1973  Switzerland .

Primary Examiner—C. C. Shaw
Attorney, Agent, or Firm—Hauke and Patalidis

[57] ABSTRACT

A method and apparatus for machining, by electrical discharges, an electrode workpiece by means of an electrode tool, wherein machining fluid supplied by a nozzle to the machining zone between the electrode tool and the electrode workpiece is returned to a tank and circulated by a pump from the tank to the nozzle through two lines, one provided with a filter and the other having no filter but controlling the flow of fluid therethrough and comprising a solid particle proportioning device. The flow rate and proportioning device is controlled by an electrical signal for regulating the concentration of solid particles in suspension in the fluid, and the adjustment for the concentration of solid particles is effected on the basis of measuring the average delay of triggering of the machining electrical discharges.

12 Claims, 2 Drawing Figures

PROCESS AND APPARATUS FOR CONTROLLING THE CONCENTRATION OF SOLID PARTICLES IN SUSPENSION IN AN EDM MACHINING FLUID

BACKGROUND OF THE INVENTION

The present invention relates to an EDM process and apparatus for machining an electrode workpiece by an electrode tool, a machining fluid consisting of electrically conductive solid particles suspended in a liquid being circulated between the electrodes, and consecutive voltage pulses being applied between the electrodes for triggering electrical discharges. More particularly, the present invention relates to an EDM process and apparatus wherein the concentration of solid particles in the machining fluid is varied as a function of a machining parameter.

It is now known that electrically conductive, or semiconductive, solid particles suspended in the dielectric machining fluid of an EDM apparatus play an important part in triggering the machining electrical discharges and have an influence on the stability and efficiency of a machining operation. It is only when the solid particles suspended in the machining fluid, which are either obtained from the material removed from the workpiece or purposely introduced into the machining fluid, reach an adequate concentration that an appropriate stable and efficient rate of material removing electrical discharges is achieved.

Until the present invention, the concentration of the solid particles in an EDM machining fluid was either maintained within a predetermined limit in the course of a machining operation, or modified as a function of an electrical discharge parameter according, for example, by the method disclosed in Swiss Pat. No. 536,680, for the purpose of varying the characteristics of the machining fluid only in the event that a deterioration of the quality of electrical discharges was detected, for example in the event that an increase in the rate of short circuits was detected. Such a known method presents the inconvenience of waiting until a machining defect appears prior to taking appropriate corrective action, and of being unable to rapidly eliminate the defect in view of the slowness with which the concentration of solid particles in the dielectric fluid can be changed.

SUMMARY OF THE INVENTION

The new process and apparatus of the present invention permit to avoid the inconveniences of the prior art by providing a change in concentration of solid particles in an EDM machining fluid as a result of anticipating a machining defect, and therefore preventing the apparition of such machining defect. The invention provides a variation of the concentration of solid particles in the machining fluid such as to maintain within predetermined limits the average time delay interval of triggering the electrical discharges.

A decrease of the average triggering delay, which indicates a deterioration of the machining efficiency is caused, for example, by a decrease of the machining gap or an abnormal increase of the contamination of the machining fluid, or eventually by both. Maintaining the average triggering delay at a predetermined value, by controlling the concentration of solid particles in suspension in the machining fluid, provides an efficient means for achieving optimized machining conditions. The electrical discharge triggering voltage influences the average triggering delay in the same direction as the concentration of solid particles, but much more rapidly. The control of the triggering delay can thus be greatly accelerated by simultaneously varying the two parameters corresponding to the pulse voltage and to the solid particle concentration in the machining fluid.

BRIEF DESCRIPTION OF THE DRAWINGS

The diverse objects and advantages of the present invention will become apparent to those skilled in the art when the following description of the best mode contemplated for practicing the invention is read in conjunction with the accompanying drawing showing, for illustrative purpose only, an apparatus for practicing the present invention, and wherein.

DETAILED DESCRIPTION OF THE PREFERRED EMBODIMENT

Figure 1:
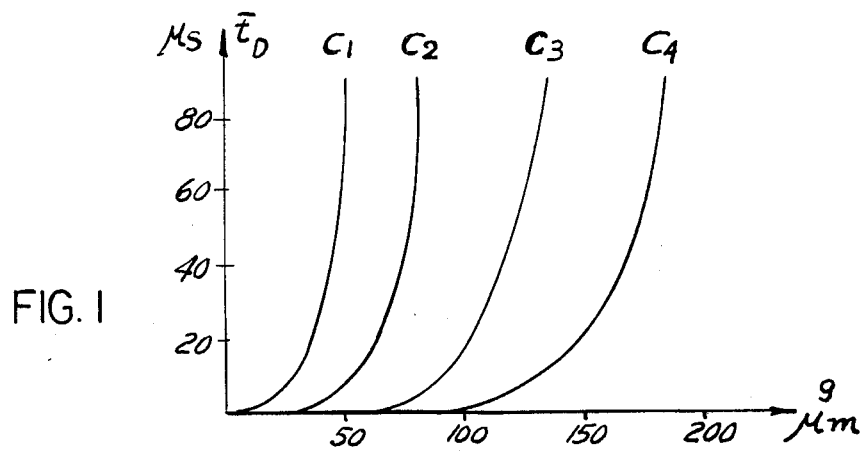
FIG. 1 is a graph illustrating the relationship between the electrical discharge triggering delay, the machining gap and the concentration of solid particles in suspension in the machining fluid of an EDM apparatus.

FIG. 1 is a diagram particularly illustrating how the average value $t_D$ of the electrical discharge triggering delay varies as a function of the machining gap g between the electrode workpiece and the electrode tool for increasing values $C_1$ to $C_4$ of the concentration of solid particles in suspension in the machining fluid.

It is readily apparent from the diagram of FIG. 1 that an increase in the concentration of solid particles permits to widen the machining gap g while maintaining the average triggering delay $t_D$ at a low level, for example at less than 10 $\mu$s. This increase in the solid particle concentration permits, consequently, to obtain high values for the machining efficiency within a relatively wide range of variation of the machining gap g.

Figure 2:
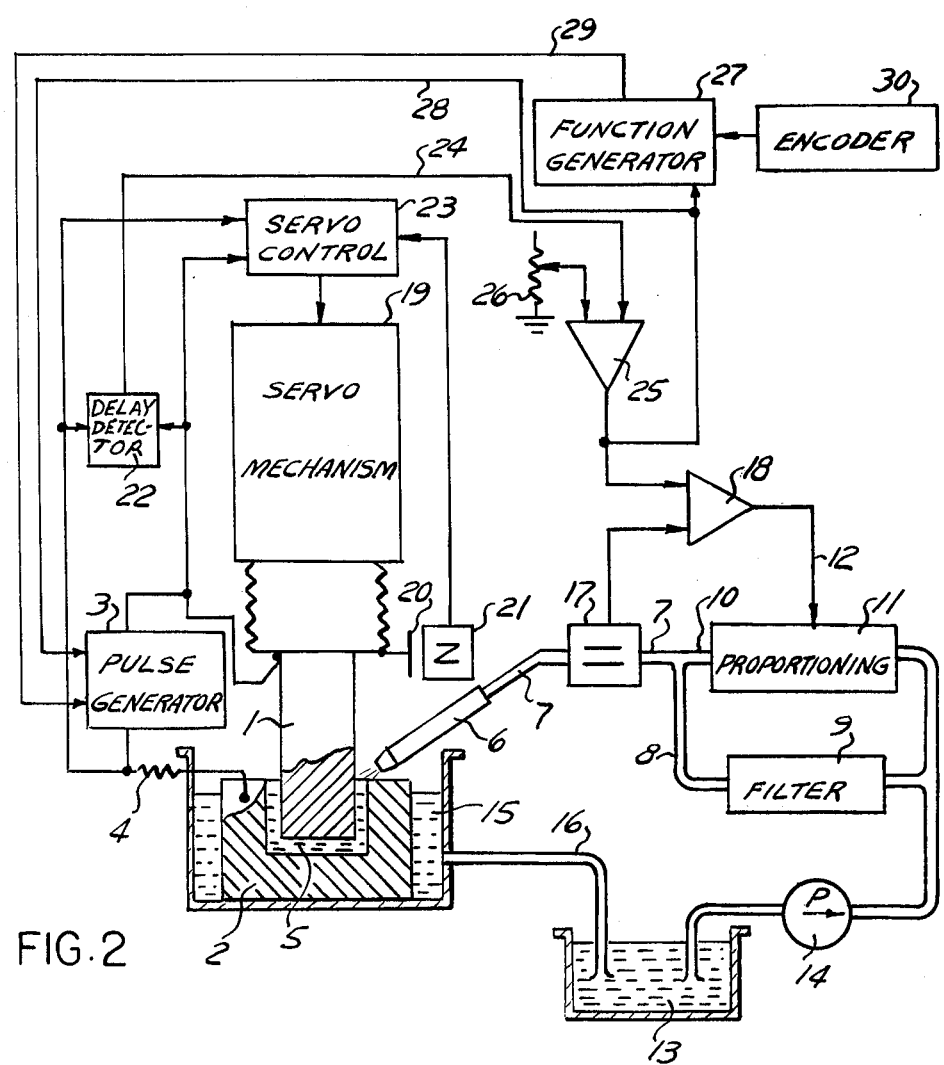
FIG. 2 is a functional schematic of an electrical discharge apparatus according to the invention.

Control of the concentration of solid particles can be achieved by means of the apparatus illustrated at FIG. 2. Electrical discharge machining occurs between an electrode tool 1 and an electrode workpiece 2 connected across a pulse generator 3 through a resistor 4.

A machining fluid, generally consisting of a dielectric liquid, is introduced into the gap 5, or machining zone, between an electrode tool 1 and an electrode workpiece 2 by means of a nozzle 6 connected to the end of a conduit 7. The inlet of the conduit 7 is connected to a conduit 8 supplying machining fluid from which solid particles have been removed by a filter 9, and to a conduit 10 supplying to the machining zone 5 machining fluid whose flow rate and concentration in solid particles are appropriately selected, or appropriately increased, by a solid particle proportioning device 11 controlled by an electrical signal supplied by a line 12.

The filter 9 and the flow rate and proportioning device 11 are connected to a settling tank 13 through a pump 14. The machining fluid, contained in an enclosure 15 in which is mounted the workpiece 2, is returned, by gravity for example, to the settling tank 13 by a conduit 16.

The machining fluid flowing through the conduit 7 circulates through a particle concentration detector 17 in which the solid particle concentration is measured by any known conventional means, for example by optical or electrical detection, or according to the method and apparatus disclosed in the Swiss Pat. No. 536,680. The particle concentration detector 17 provides an electrical signal representing the concentration of solid particles in the machining fluid, and that electrical signal is compared to a reference signal in an op-amp comparator 18, whose output is connected to the proportioning device 11 by the line 12. The concentration of particles suspended in the machining fluid can thus be adjusted to a value corresponding to the reference signal applied to one of the inputs of the op-amp comparator 18.

The machining gap 5 between the electrode tool 1 and the electrode workpiece 2 is maintained constant in the course of a machining operation by displacing the electrode tool 1 by means of a servo mechanism 19. The position of the electrode tool 1 is determined by a position detector or transducer having a movable member 20 connected to the electrode tool 1 such as to be displaced in conjunction therewith and a stationary element 21 in which is established signal representative of the position of the electrode tool 1 along an appropriate axis, such as the Z-axis.

The average electrical discharge triggering delay is determined by a detector circuit 22 connected across the electrode tool 1 and a terminal of the resistor 4. The detector circuit 22 detects respectively the moment at which a voltage pulse is applied to the electrode tool 1 and the moment at which a machining current pulse is established. The triggering delay detector circuit 22 can take several forms, for example, as disclosed in U.S. Pat. No. 3,825,714, assigned to the same assignee as the present application.

The servo mechanism 19 is controlled by a servo control 23 having two inputs connected to the inputs of the triggering delay detector circuit 22 and a third input connected to the position detector 21. The servo control 23 which, for example, is according to the apparatus disclosed in U.S. Pat. No. 4,049,942, assigned to the same assignee as the present application, permits to maintain a constant machining gap in the course of a machining operation. It also permits, under the control of the position detector 21, to prevent the electrode tool 1 from being fed beyond a predetermined longitudinal position.

The signal at the output of the triggering delay detector circuit 22 is applied by a line 24 to one of the inputs of an op-amp comparator 25 whose other input receives a reference signal supplied by a potentiometer 26. The output of the comparator 25 is connected to one of the inputs to the comparator 18 and to one of the inputs of the pulse generator 3 through a line 28. A function generator 27, connected to the pulse generator 3 via a line 29, is programmed according to coded data, supplied by an encoding circuit 30, the different couples of electrode tool-electrode workpiece combinations being coded according to material compositions and other technical considerations.

According to a first mode of operation, the machining gap 5 is maintained at a constant value by the servo control 23. When the contamination of the machining fluid varies in the course of a machining operation, this results in a variation of the average delay of triggering of the electrical discharges in conformity with what is represented on the diagram of FIG. 1. As soon as the value of the average triggering delay does not coincide with the reference value set by the potentiometer 26, the comparator 25 modifies at its output the value of the reference signal adjusting the concentration of solid particles and the signal at the output of the comparator 18 controls the proportioning device 11 until the measured signal representative of the concentration is equal to the reference value. Simultaneously with adjusting the concentration of solid particles in the machining fluid, the comparator 25 provides a signal on line 28 which is applied to the pulse generator 3 such as to vary the triggering voltage of the pulses and such as to accelerate the adjustment of the average triggering delay. For example, in the event that the average triggering delay increases due to a decrease in the concentration of solid particles, the amplitude of the voltage pulses is increased simultaneously with adjusting the concentration. Thus, an optimization of machining stability is achieved, which results in a considerable increase in the rate of rapid displacements of the electrode tool in the course of machining and in an increase of the material removal efficiency rate.

According to another mode of operation, the feed of the electrode tool 1 is stopped by the electrode tool position detector 21 when the electrode tool has been fed to a predetermined depth, for example. Under such a condition, the widening of the machining gap causes a rapid increase of the average triggering delay, and the apparatus of the invention, as hereinbefore described, causes a simultaneous increase of the particle concentration and of the voltage pulse amplitude such as to pull back the average triggering delay to its pre-set reference value.

A widening of the machining gap occurs on the front surface as well as on the lateral surface of the workpiece, such that a simultaneous decrease of the power of the electrical discharges permits to achieve several consecutive finishing passes by means of the same electrode tool, and without effecting an artificial expansion of the electrode tool by means of a transverse lateral displacement of the electrode tool. For the same average triggering delay and for the same electrode couple combination, measuring the solid particle concentration is the equivalent of measuring the machining gap. It is thus possible to use the value of the signal at the output of the comparator 25 to vary the machining rate by means of the function generator 27 in the course of a finishing pass.

Good results are achieved by contaminating the machining fluid by addition of graphite powder or aluminum powder having a grain size not more than a few microns. By increasing the concentration of powder in the machining fluid up to about 1% by volume, it is possible to machine under favorable conditions with the machining gap varying in a ratio of 1 to 10, or even more.

It will be readily apparent to those skilled in the art that the present invention has many applications to a variety of machining fluids of diverse compositions, and to a variety of methods for measuring machining gaps.

Having thus described the present invention by way of an example of structure embodying the principle of the invention, modification whereof will be apparent to those skilled in the art, what is claimed as new is as follows:

1. A method for electrical discharge machining of an electrode workpiece by an electrode tool wherein a machining fluid is circulated through a machining zone between the electrodes, said machining fluid comprising electrical conductive solid particles in suspension in a liquid, and wherein voltage pulses are applied across the electrodes for triggering delayed electrical discharges and the concentration of particles in the machining fluid is varied as a function of a machining parameter, the improvement comprising measuring the average triggering delay of said electrical discharges, and varying said concentration of solid particles for maintaining the average triggering delay of said electrical discharges within predetermined limits.

2. The method of claim 1 further comprising varying the amplitude of said voltage pulses simultaneously with varying the concentration of solid particles.

3. The method of claim 1 wherein the electrodes are maintained in a predetermined relative position and the power of the electrical discharges is decreased as a function of the increase of the concentration of solid particles in suspension in said machining fluid.

4. An apparatus for machining by electrical discharges an electrode workpiece by means of an electrode tool wherein a machining fluid is circulated through a machining zone between the electrodes, said machining fluid comprising electrically conductive solid particles in suspension in a liquid, and wherein voltage pulses are applied between said electrodes for triggering electrical discharges, said apparatus comprising means for measuring the average value of the delay time interval between applying a voltage pulse across the electrodes and an electrical discharge flowing acrsss said electrodes, means for establishing a first signal representative of said average value, means for establishing a second signal controling the concentration of solid particles in suspension in the machining fluid, means for comparing said first signal to a reference signal, means for adjustably varying said second signal as a function of the difference between said first signal and said reference signal, and means for varying the concentration of said solid particles in suspension in said machining liquid flow as a function of said second signal.

5. The apparatus of claim 4 further comprising means for maintaining the electrodes in a predetermined relative position, and a function generator for decreasing the current level of the electrical discharges in response to variations of said second signal.

6. The apparatus of claim 4 further comprising means for varying the electrical discharge triggering voltage in response to variations of said second signal.

7. In an apparatus for electrical discharge machining of an electrode workpiece by an electrode tool wherein a machining fluid is circulated through a machining zone between the electrodes, said machining fluid comprising electrical conductive solid particles in suspension in a liquid, and wherein voltage pulses are applied across the electrodes for triggering delayed electrical discharges and the concentration of particles in the machining fluid is varied as a function of a machining parameter, the improvement comprising means for measuring the average triggering delay of said electrical discharges, and means for varying said concentration of solid particles for maintaining the average triggering delay of said electrical discharges within predetermined limits.

8. The improvement of claim 7 further comprising means for varying the amplitude of said voltage pulses simultaneously with varying the concentration of solid particles.

9. The improvement of claim 7 further comprising means for maintaining the electrodes in a predetermined relative position and means for decreasing the power of the electrical discharges as a function of the increase of the concentration of solid particles in suspension in said machining fluid.

10. A method for machining by electrical discharges an electrode workpiece by means of an electrode tool wherein a machining fluid is circulated through a machining zone between the electrodes, said machining fluid comprising electrically conductive solid particles in suspension in a liquid, and wherein voltage pulses are applied between said electrodes for triggering electrical discharges, said method comprising measuring the average value of the delay time interval between applying a voltage pulse across the electrodes and an electrical discharge flowing across said electrodes, establishing a first signal representative of said average value, establishing a second signal controlling the concentration of solid particles in suspension in the machining fluid, comparing said first signal to a reference signal, adjustably varying said second signal as a function of the difference between said first signal and said reference signal, and varying the concentration of said solid particles in suspension in said machining liquid fluid as a function of said second signal.

11. The method of claim 10 further comprising maintaining the electrodes in a predetermined relative position, and decreasing the current level of the electrical discharges in response to variations of said second signal.

12. The mthod of claim 10 further comprising varying the electrical discharge triggering voltage in response to variations of said second signal.

* * * * *